(12) United States Patent
Oda et al.

(10) Patent No.: US 7,447,442 B2
(45) Date of Patent: Nov. 4, 2008

(54) LIGHT EMITTING DEVICE AND COMMUNICATION SYSTEM

(75) Inventors: Atsushi Oda, Tokyo (JP); Kazuhiko Hayashi, Tokyo (JP); Satoru Toguchi, Tokyo (JP)

(73) Assignee: Samsung SDI Co., Ltd., Suwon (KR)

( * ) Notice: Subject to any disclaimer, the term of this patent is extended or adjusted under 35 U.S.C. 154(b) by 542 days.

(21) Appl. No.: 10/267,220

(22) Filed: Oct. 9, 2002

(65) Prior Publication Data

US 2003/0067660 A1   Apr. 10, 2003

(30) Foreign Application Priority Data

Oct. 9, 2001   (JP) ............... 2001-311659

(51) Int. Cl.
H04B 10/00  (2006.01)
H04B 10/02  (2006.01)

(52) U.S. Cl. ...................... 398/172; 398/127
(58) Field of Classification Search ................ 398/127, 398/130, 131, 172
See application file for complete search history.

(56) References Cited

U.S. PATENT DOCUMENTS

| | | | | |
|---|---|---|---|---|
| 5,575,459 A | * | 11/1996 | Anderson | 362/240 |
| 5,633,629 A | * | 5/1997 | Hochstein | 340/907 |
| 5,657,145 A | | 8/1997 | Smith | |
| 5,664,220 A | | 9/1997 | Itoh et al. | 710/6 |
| 5,940,769 A | | 8/1999 | Nakajima et al. | 455/509 |
| 6,437,893 B1 | * | 8/2002 | Rivollet et al. | 398/153 |
| 6,504,633 B1 | * | 1/2003 | Hovorka et al. | 398/183 |

FOREIGN PATENT DOCUMENTS

| | | |
|---|---|---|
| CN | 1190322 | 8/1998 |
| JP | 61-202536 | 3/1985 |
| JP | 62-48139 | 3/1987 |
| JP | 4-504938 | 8/1992 |
| JP | 7-64878 | 8/1993 |
| JP | 2001-119338 | 7/1994 |
| JP | 8-274758 | 3/1995 |
| JP | 10-135915 | 4/1997 |
| JP | 11-127170 | 10/1997 |
| JP | 10270171 | 10/1998 |
| JP | 2001-069251 | 3/2001 |
| KR | 0125583 | 10/1997 |
| WO | WO 96/03811 | 7/1995 |
| WO | WO 9802846 A1 * | 1/1998 |
| WO | 99/53633 | 10/1999 |

* cited by examiner

Primary Examiner—Christina Y Leung
(74) Attorney, Agent, or Firm—H.C. Park & Associates, PLC

(57) ABSTRACT

A communication system includes: at least one light-emitting device for emitting a light; and at least one light-receiving device for receiving the light emitted from the at least one light-emitting device. The light-emitting device further includes: at least one driver unit for generating a modified current based on an externally entered information signal; and at least one light-emitting unit operatively and functionally coupled to the at least one driver unit for receiving the modified current and emitting a modified signal light including any information based on the modified current. The at least one light-emitting unit includes at least one electroluminescence element.

16 Claims, 13 Drawing Sheets

Time

LIGHT EMITTING DEVICE AND COMMUNICATION SYSTEM

BACKGROUND OF THE INVENTION

1. Field of the Invention

The present invention relates to a light emitting device for realizing an optical communication, and an optical communication device including a light emitting device as well as an optical communication system including a light emitting device All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

Some of the conventional techniques for realizing the information communication device and system by use of an illumination device have been proposed.

Japanese laid-open patent publication No. 61-202536 discloses an optical communication method and system, wherein the system includes an illumination device and a light-receiving device which detects a light intensity and light spectrum. The light intensity or the quantity of photons emitted from the illumination device is modified in accordance with a transmission signal. A signal device detects the intensity of or the spectrum of the modified light from the illumination device to demodulate the transmission signal. The illumination device has both functions of illumination and transmitter for transmitting data.

Japanese laid-open patent publication No. 62-48139 discloses a data communication device which has a transmission control means for subjecting a predetermined signal to a high frequency modification for transmission onto an electric light line, an illumination device lighting by the electric light line, an optical sensor for receiving the light from the illumination device and detecting a high frequency signal, and a receiving control means for demodulating the high frequency signal.

Japanese laid-open patent publication No. 11-127170 discloses a communication method for data transmission between computers by use of a fluorescent lamp without use of any cable or data transmission line, wherein a power inverter of an illumination device using a fluorescent lump is driven by transmission data so as to realize data transmission depending on an illumination light from the fluorescent lump, so that a computer receives the illumination light for demodulating the modulated signal transmitted on the illumination light and receiving the data.

Japanese laid-open patent publication No. 2001-119338, corresponding to WO96/03811, discloses a power consumption control method and apparatus for a communication system subscriber unit, wherein a subscriber unit of a time division multiple access (TDMA) radiotelephone system is reconfigured in each time slot to a power consumption tessellation.

Japanese laid-open patent publication No. 07-064878, which corresponds to U.S. Pat. No. 5,664,220, discloses an information transmission/reception system which can receive a plurality of transmission requests and transmit information to requesters.

Japanese laid-open patent publication No. 08-274758, which corresponds to U.S. Pat. No. 5,940,769, discloses a radio communication system capable of effectively utilizing the channel by rational transmission of data in radio transmission.

The above-described Japanese laid-open patent publications Nos. 61-202536 and 62-48139 do not disclose the fluorescence. The above-described Japanese laid-open patent publication No. 11-127170 discloses the fluorescent lamp as the light-emitting device.

In order to realize the communication system using the light, it is important how to select the luminescence material because the data transmission speed of the communication system depends on a rising time of in luminance of the luminescence material. In order to realize a high data transmission speed of the communication system, a shortened rising time of the luminance of the luminescence material is essential.

It is no doubt apparent that the fluorescent lamp is unsuitable for realizing a high data transmission speed of the communication system because the rising time of the luminance of the fluorescent lamp is extremely slow, for example, as slow as seconds-order.

Another system for reproducing informations which were stored in an information storage unit has been known, wherein an identification-required object such as goods on a shop is attached with a bar-code pattern which serves as an information storage unit for storing predetermined informations, so that the informations stored in the form of the bar-code pattern as the information storage unit may be reproduced by use of a bar-code reader so as to reproduce the information related to the identification-required object.

The last-described conventional technique using the bar-code pattern is inconvenient because it is necessary for renewing the information to replace the bar-code pattern, which stores the old information into a new bar-code pattern which stores a new information.

The replacement of many informations assigned to many identification-required objects is time-consuming and costly procedure. Overwriting the information, for example, adding the new bar-code pattern to the old bar-code pattern allows any third party including consumer to be aware of the fact that the information on the bar-code pattern was replaced or renewed, and also to know the old informations on the old bar-code pattern. Two or plural bar-code patterns attached onto the identification-required object may cause deterioration in appearance of the identification-required object. In order to avoid these problems, it is, of course, needed to remove the old informations, for example, the old bar-code pattern. This removal process may also take a further longer time and a further cost. In worst case, the removal process may provide any damage to the identification-required object.

In the above circumstances, there is desirable the development of a novel communication system including a new light-emitting device being suitable for realizing a high speed data transmission and also being free from the above problems.

SUMMARY OF THE INVENTION

Accordingly, it is an object of the present invention to provide a novel communication system being free from the above problems.

It is a further object of the present invention to provide a novel communication system including a new light-emitting device being suitable for realizing a high speed data transmission.

It is a still further object of the present invention to provide a novel communication system capable of renewing and/or reproducing the informations attached to the identification-required object or re-writing the information stored in the storage unit attached to the identification-required object conveniently, however, without need for any additional procedures.

It is yet a further object of the present invention to provide a novel communication system capable of renewing and/or reproducing the informations attached to the identification-required object or re-writing the information stored in the storage unit attached to the identification-required object without placing the third party in an allowable condition for knowing or being aware of the fact of the renewal and/or the old information as renewed.

It is further more object of the present invention to provide a novel communication system capable of renewing and/or reproducing the informations attached to the identification-required object or re-writing the information stored in the storage unit attached to the identification-required object without providing any substantive damage to the identification-required object.

It is moreover object of the present invention to provide a novel communication system capable of renewing and/or reproducing the informations attached to the identification-required object or re-writing the information stored in the storage unit attached to the identification-required object without deterioration of appearance of the identification-required object.

It is another object of the present invention to provide a novel light-emitting device which makes the communication system free from the above problems.

It is further another object of the present invention to provide a novel light-emitting device included in the communication system being suitable for realizing a high speed data transmission.

It is still further another object of the present invention to provide a novel light-emitting device included in the communication system capable of renewing and/or reproducing the informations attached to the identification-required object or re-writing the information stored in the storage unit attached to the identification-required object conveniently, however, without need for any additional procedures.

It is yet further another object of the present invention to provide a novel light-emitting device included in the communication system capable of renewing and/or reproducing the informations attached to the identification-required object or re-writing the information stored in the storage unit attached to the identification-required object without placing the third party in an allowable condition for knowing or being aware of the fact of the renewal and/or the old information as renewed.

It is yet more object of the present invention to provide a novel light-emitting device included in the communication system capable of renewing and/or reproducing the informations attached to the identification-required object or re-writing the information stored in the storage unit attached to the identification-required object without providing any substantive damage to the identification-required object.

It is still more object of the present invention to provide a novel light-emitting device included in the communication system capable of renewing and/or reproducing the informations attached to the identification-required object or re-writing the information stored in the storage unit attached to the identification-required object without deterioration of appearance of the identification-required object.

The present invention provides a light-emitting device including: at least one driver unit for generating a modified current based on an externally entered information signal; and at least one light-emitting unit operatively and functionally coupled to the at least one driver unit for receiving the modified current and emitting a modified signal light including any information based on the modified current, wherein the at least one light-emitting unit includes at least one electroluminescence element.

The present invention also provides a communication system including: at least one light-emitting device for emitting a light; and at least one light-receiving device for receiving the light emitted from the at least one light-emitting device. The at least one light-emitting device further includes: at least one driver unit for generating a modified current based on an externally entered information signal; and at least one light-emitting unit operatively and functionally coupled to the at least one driver unit for receiving the modified current and emitting a modified signal light including any information based on the modified current, wherein the at least one light-emitting unit includes at least one electroluminescence element.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
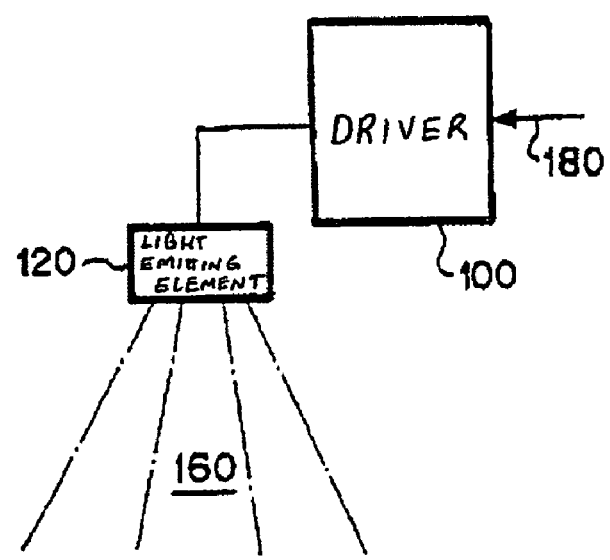
FIG. 1 is a block diagram illustrative of a novel light-emitting device included in the novel communication system in a preferred embodiment in accordance with the present invention.

A first aspect of the present invention is a light-emitting device including: at least one driver unit for generating a modified current based on an externally entered information signal; and at least one light-emitting unit operatively and functionally coupled to the at least one driver unit for receiving the modified current and emitting a modified signal light including any information based on the modified current, wherein the at least one light-emitting unit includes at least one electroluminescence element.

In one typical embodiment, the modified signal light may not only include any information but also serve as illumination.

In one typical embodiment, the at least one driver unit may also generate a non-modified current upon no entry of any externally entered information signal, and the at least one light-emitting unit may receive the non-modified current and may emit a non-signal illumination light free of any information. In one example, the at least one light-emitting unit may emit the modified signal light in different time period from emission of the non-signal illumination light.

In one example, the modified signal light may have an averaged light-intensity which is substantially similar or equal to a constant light intensity of the non-signal illumination light.

In another example, the light-emitting device may further include: at least one secondary light-emitting unit operatively and functionally separated from the at least one driver unit and also from the at least one light-emitting unit for emitting a non-signal illumination light free of any information. The at least one driver unit may also generate a non-modified current upon no entry of any externally entered information signal, and the at least one light-emitting unit may receive the non-modified current and may emit a non-signal illumination light free of any information. The at least one light-emitting unit may emit the modified signal light in different time period from emission of the non-signal illumination light.

In one preferable example, the modified signal light may has an averaged light-intensity which is substantially similar or equal to a constant light intensity of the non-signal illumination light.

In one example, the at least one light-emitting unit may comprise first and second light-emitting unit groups, each of which is capable of emitting both the modified signal light and the non-signal illumination light. Each of the first and second light-emitting unit groups may emit the modified signal light and the non-signal illumination light alternately. The at least one driver unit may further comprise: a first driver unit electrically coupled to the first light-emitting unit group for supplying the first light-emitting unit group with a first modified current upon entry of the externally entered information signal or a first non-modified current upon no entry of any information signal; and a second driver unit electrically coupled to the second light-emitting unit group for supplying the second light-emitting unit group with a second modified current upon entry of the externally entered information signal or a second non-modified current upon no entry of any information signal. The light-emitting device may further include: an AC-power supply, to which the first and second light-emitting emitting unit groups are electrically coupled in opposite polarities to each other. At least one group of the first and second light-emitting unit groups may comprise a plurality of light-emitting element, some of which are connected in series to each other.

A second aspect of the present invention is a communication system including: at least one light-emitting device for emitting a light; and at least one light-receiving device for receiving the light emitted from the at least one light-emitting device. The at least one light-emitting device further includes: at least one driver unit for generating a modified current based on an externally entered information signal; and at least one light-emitting unit operatively and functionally coupled to the at least one driver unit for receiving the modified current and emitting a modified signal light including any information based on the modified current, wherein the at least one light-emitting unit includes at least one electroluminescence element.

In one typical embodiment, the modified signal light may not only include any information but also serve as illumination.

In one typical embodiment, the at least one driver unit may also generate a non-modified current upon no entry of any externally entered information signal, and the at least one light-emitting unit may receive the non-modified current and may emit a non-signal illumination light free of any information. In one example, the at least one light-emitting unit may emit the modified signal light in different time period from emission of the non-signal illumination light.

In one example, the modified signal light may have an averaged light-intensity which is substantially similar or equal to a constant light intensity of the non-signal illumination light.

In another example, the light-emitting device may further include: at least one secondary light-emitting unit operatively and functionally separated from the at least one driver unit and also from the at least one light-emitting unit for emitting a non-signal illumination light free of any information. The at least one driver unit may also generate a non-modified current upon no entry of any externally entered information signal, and the at least one light-emitting unit may receive the non-modified current and may emit a non-signal illumination light free of any information. The at least one light-emitting unit may emit the modified signal light in different time period from emission of the non-signal illumination light.

In one preferable example, the modified signal light may has an averaged light-intensity which is substantially similar or equal to a constant light intensity of the non-signal illumination light.

In one example, the at least one light-emitting unit may comprise first and second light-emitting unit groups, each of which is capable of emitting both the modified signal light and the non-signal illumination light. Each of the first and second light-emitting unit groups may emit the modified signal light and the non-signal illumination light alternately. The at least one driver unit may further comprise: a first driver unit electrically coupled to the first light-emitting unit group for supplying the first light-emitting unit group with a first modified current upon entry of the externally entered information signal or a first non-modified current upon no entry of any information signal; and a second driver unit electrically coupled to the second light-emitting unit group for supplying the second light-emitting unit group with a second modified current upon entry of the externally entered information signal or a second non-modified current upon no entry of any information signal. The light-emitting device may further include: an AC-power supply, to which the first and second light-emitting unit groups are electrically coupled in opposite polarities to each other. At least one group of the first and second light-emitting unit groups may comprise a plurality of light-emitting element, some of which are connected in series to each other.

In one example, the at least one light-receiving device may further include: at least one light-receiving element for receiving the modified signal light emitted from the at least one light-emitting device and converting the modified signal light into an electric signal.

In another example, the at least one light-receiving device may further include: at least one light-receiving element for receiving the modified signal light emitted from the at least one light-emitting device and converting the modified signal light into an electric signal; and at least one signal converter unit electrically coupled to the at least one light-receiving element for converting the electric signal into data.

In still another example, the at least one light-receiving device may further include: at least one light-receiving element for receiving the modified signal light emitted from the at least one light-emitting device and converting the modified signal light into an electric signal; at least one signal converter unit electrically coupled to the at least one light-receiving element for converting the electric signal into data; and at least one storage unit electrically coupled to the at least one signal converter unit for storing the data. The at least one light-receiving device may be provided on an object for serving as an information tag.

In yet another example, the at least one light-receiving device may further include: at least one light-receiving element for receiving the modified signal light emitted from the at least one light-emitting device and converting the modified signal light into an electric signal; at least one signal converter unit electrically coupled to the at least one light-receiving element for converting the electric signal into data; at least one storage unit electrically coupled to the at least one signal converter unit for storing the data; and at least one information output unit electrically coupled to the at least one storage unit for receiving the data and displaying informations based on the data.

In one typical example, the at least one light-receiving device may receives the modified signal light emitted from the at least one light-emitting device and convert the modified signal light into an electric signal, and the at least one light-receiving device may be electrically coupled to an equipment for supplying the electric signal and controlling the equipment based on the electric signal.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

Preferred Embodiment

A preferred embodiment according to the present invention will be described in detail with reference to the drawings. The preferred embodiment provides a novel communication system including a new light-emitting device, wherein the communication system is suitable for realizing a high speed data transmission and is capable of renewing and reproducing informations attached to an identification-required object or replacing an information storage unit attached to the identification-required object conveniently, however, with no need for any additional procedures nor placing the third party in an allowable condition for knowing or being aware of the fact of the renewal and/or the old information as renewed, as well as without providing any substantive damage to the identification-required object and deterioration of appearance of the identification-required object.

The novel communication system including a new light-emitting device which realizes the above-desired communication system. The light-emitting device is included in the communication system. FIG. 1 is a block diagram illustrative of a novel light-emitting device included in the novel communication system in a preferred embodiment in accordance with the present invention.

The light-emitting device may include a light-emitting element driver 100 and a light-emitting element 120. The light-emitting element driver 100 drives the light-emitting element 120 for enabling the light-emitting element 120 to emit a light 160. In order to realize a desired high speed data transmission, it is essential to obtain a shortened rise time of the luminance of the light 160 emitted from the light-emitting element 120, for which reason it is important what kind of light-emitting element is used or selected for the light-emitting element 120. In accordance with the present invention, the light-emitting element 120 may comprise at least one electroluminescence element for the purpose of obtaining shortened rise time of the luminance of the light 160 emitted from the light-emitting element 120. The light-emitting element 120 will sometime hereinafter be referred to as an electroluminescence element 120.

The light-emitting element driver 100 may receives selective entry an external information signal 180 and does output a driving current in accordance with the external information signal 180. The entry of the external information signal 180 into the light-emitting element driver 100 causes the light-emitting element driver 100 to perform a predetermined modification process for modifying the driving current in accordance with the external information signal 180 before the light-emitting element driver 100 outputs a modified driving current. No entry of the external information signal 180 into the light-emitting element driver 100 causes the light-emitting element driver 100 to perform a direct output of the non-modified driving current without any modification process. The modification of the driving current may include any available and useful modification process, for example, but not limited to amplitude-modification (AM) and frequency-modification (FM).

The modified or non-modified driving current is supplied to the light-emitting element 120. The light-emitting element 120 receives either the modified driving current or the non-modified driving current from the light-emitting element driver 100. Upon receipt of the modified driving current, the light-emitting element 120 emits a modified signal light based on the modified driving current from the light-emitting element driver 100, wherein the modified signal light serves as an optical signal which corresponds to the external information signal 180 for realizing data transmission depending upon the modified signal light 160 emitted from the light-emitting element 120. Upon receipt of the non-modified driving current, the light-emitting element 120 emits a non-modified non-signal light based on the non-modified driving current from the light-emitting element driver 100, wherein the non-modified non-signal light merely serves as illumination or normal light.

Figure 2:
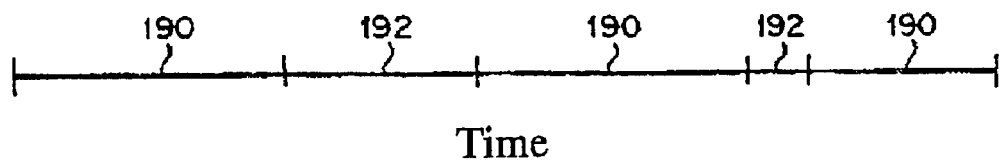
FIG. 2 is a view illustrative of an example of time-sequence of the modified signal light and non-modified non-signal light emitted from the light-emitting element shown in FIG. 1.

FIG. 2 is a view illustrative of an example of time-sequence of the modified signal light and non-modified non-signal light emitted from the light-emitting element shown in FIG. 1. "190" represents a non-modified non-signal light emitting period, wherein the non-modified non-signal light is emitted from the light-emitting element 120 upon receipt of the non-modified driving current from the light-emitting element driver 100. "192" represents a modified signal light emitting period, wherein the modified signal light is emitted from the light-emitting element 120 upon receipt of the modified driving current from the light-emitting element driver 100. No entry of the external information signal 180 into the light-emitting element driver 100 causes the light-emitting element 120 to emit the non-modified non-signal light as illumination or normal light. The entry of the external information signal 180 into the light-emitting element driver 100 causes the light-emitting element 120 to emit the modified signal light as the optical signal which corresponds to the entered external information signal 180 for realizing data transmission depending upon the modified signal light 160 emitted from the light-emitting element 120.

The modified signal light or the non-modified non-signal light emitted from the light-emitting element 120 is then received by a light receiving element which is not illustrated in FIG. 1. The data or informations transmitted on the modified signal light received by the non-illustrated light receiving element may subsequently be stored in a storage unit or a storage medium or transmitted to an external device which is not illustrated.

As described above, in accordance with the present invention, the light-emitting element 120 comprises the electroluminescence element for realizing the desired high speed information transmission with a brightness as the illumination. The speed of the information transmission realized by the light-emitting element 120 comprising the electroluminescence element is much higher than the transmission speed realized by the fluorescent lamp, because the electroluminescence element not only has a sufficiently high luminescent intensity for providing a sufficiently large brightness but also exhibits a desired high speed response of variation in luminescence-intensity or luminance in accordance with variation in the driving current. The rising time of the luminance is approximately 1 micro-second, for example. The high speed response of variation in luminescence-intensity or luminance in accordance with variation in the driving current allows a desired high speed data transmission.

The electroluminescence element for the light-emitting element 120 may include any available electroluminescence elements, for example, inorganic electroluminescence elements and organic electroluminescence elements. Particularly, a variety of the organic electroluminescence elements has been well known, for example, but not limited to a typical lamination structure over a transparent substrate. One typical example, of the lamination structure may, for example, include a luminescence layer, an electron transport layer, and a hole transport layer.

The light-emitting element 120 may comprise at least one electroluminescence element for the purpose of obtaining shortened rise time of the luminance of the light 160 emitted from the light-emitting element 120. The single electroluminescence element may be used for emitting a light having a desired spectrum, for example, a white-light. A plurality of electroluminescence element may also be used for emitting another light having another desired spectrum.

If the modified signal light is different in luminescent intensity from the non-modified non-signal light, then the light 160 emitted from the light-emitting element 120 may be flickered. In order to solve or avoid this flickering, it is effective that a time period of emitting the modified signal light is made shorter than a critical time period which is the minimum time period for allowing human to be sensible to lightness variation. It has been know that the minimum time period is approximately 1 ms. If the time period of emitting the modified signal light is shorter than 1 ms, then the human can be insensible to flickering of the light 160 emitted from the light-emitting element 120.

If only one time emission of the modified signal light within the shortened time period than 1 ms is insufficient for transmitting all of data or informations which are intended, then it may be effective, particularly in case of not so large amount of data to perform periodical and alternating emissions of the modified signal light within the shortened time period than 1 ms and the non-modified non-signal light.

Another available method for suppressing flickering the emitted light 160 is to make the modified signal light and the non-modified non-signal light uniform to each other in the brightness or the luminescence intensity. In this case, not only the non-modified non-signal light but also the modified signal light may serve as the illumination. In the other words, the modified signal light may serve as not only the optical signals but also the illumination.

Figure 3:
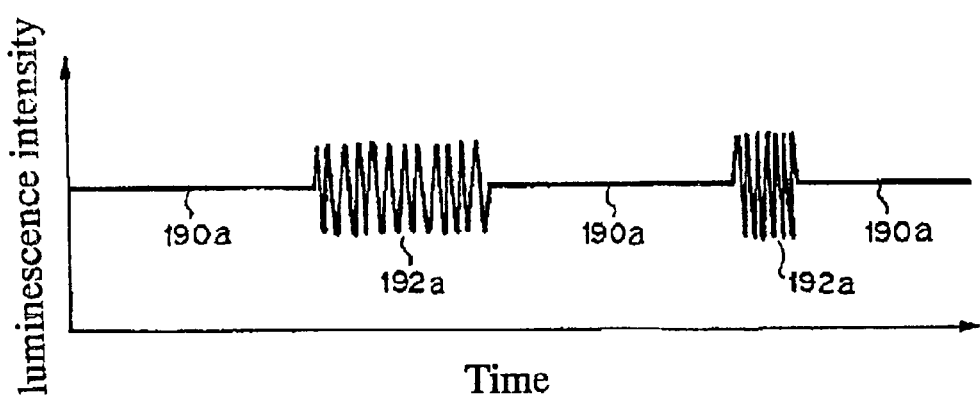
FIG. 3 is a diagram illustrative of time-variation in luminescence intensity of the light emitted from the light-emitting element shown in FIG. 1, wherein the modified signal light is adjusted to be substantially equal in luminescence intensity to the non-modified non-signal light.

FIG. 3 is a diagram illustrative of time-variation in luminescence intensity of the light emitted from the light-emitting element shown in FIG. 1, wherein the modified signal light is adjusted to be substantially equal in luminescence intensity to the non-modified non-signal light. The non-modified non-signal light is generated by the light-emitting element 120 upon receipt of a DC-current. The modified signal light is generated by the light-emitting element 120 upon receipt of a modified current which is adjusted so that the modified signal light has an averaged luminescence intensity level which is equal to a constant luminescence intensity level of the non-modified non-signal light. The modified signal light has a high frequency as illustrated in FIG. 3, wherein "190a" represents the time period of emitting the non-modified non-signal light, while "192a" represents the time period of emitting the modified signal light. The frequency of the modified signal light is sufficiently higher for making human insensible to any flickering of the modified signal light, for which reason the light 160 emitted from the light-emitting element 120 makes human insensible to flickering. This means that the light 160 emitted from the light-emitting element 120 is useful as the desired illumination.

Figure 4:
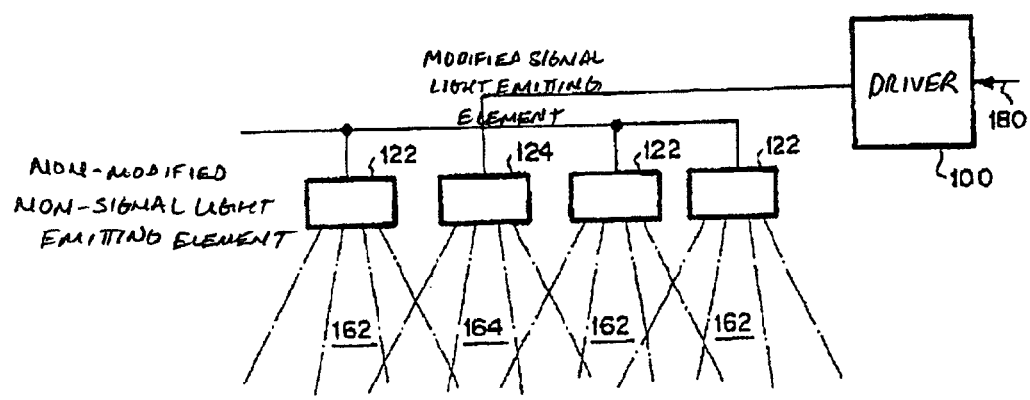
FIG. 4 is a block diagram illustrative of another novel light-emitting device included in the novel communication system in another preferred embodiment in accordance with the present invention.

As described above, the light-emitting element 120 may comprise either the single electroluminescence element or a set of the plural electroluminescence elements. The typical example, that the light-emitting element 120 comprises the single electroluminescence element, has been described above and is illustrated in FIG. 1. Another typical example will hereby be described, wherein the light-emitting element 120 comprises a set of the plural electroluminescence elements. FIG. 4 is a block diagram illustrative of another novel light-emitting device included in the novel communication system in another preferred embodiment in accordance with the present invention.

The light-emitting device may include a light-emitting element driver 100, at least one non-modified non-signal light emitting element 122 and at least one modified signal light emitting element 124. Each of the at least one non-modified non-signal light emitting element 122 emits a non-modified non-signal light 162. Each of the at least one modified signal light emitting element 124 emits a modified signal light 164. The at least one modified signal light emitting element 124 is operatively and functionally coupled to the light-emitting element driver 100. The at least one non-modified non-signal light emitting element 122 is separated from the light-emitting element driver 100. In one example, the at least one non-modified non-signal light emitting element 122 may be three non-modified non-signal light emitting elements 122, while the at least one modified signal light emitting element 124 may be a single modified signal light emitting element 124. The respective numbers of the non-signal light emitting element 122 and the modified signal light emitting element 124 are optional and selectable, and thus may be decided depending upon desired spectrums.

The light-emitting element driver 100 drives the modified signal light emitting element 124 for enabling the modified signal light emitting element 124 to emit a modified signal light 164. In order to realize a desired high speed data transmission, it is essential to obtain a shortened rise time of the luminance of the modified signal light 164 emitted from the modified signal light emitting element 124, for which reason it is important what kind of light-emitting element is used or selected for the modified signal light emitting element 124 In accordance with the present invention, the modified signal light emitting element 124 may comprise at least one electroluminescence element for the purpose of obtaining shortened rise time of the luminance of the modified signal light 164 emitted from the modified signal light emitting element 124. The modified signal light emitting element 124 will sometime hereinafter be referred to as an electroluminescence element 124.

The light-emitting element driver 100 may receives selective entry an external information signal 180 and does output a driving current in accordance with the external information signal 180. The entry of the external information signal 180 into the light-emitting element driver 100 causes the light-emitting element driver 100 to perform a predetermined modification process for modifying the driving current in accordance with the external information signal 180 before the light-emitting element driver 100 outputs a modified driving current. No entry of the external information signal 180 into the light-emitting element driver 100 causes the light-emitting element driver 100 to perform a direct output of the non-modified driving current without any modification process. The modification of the driving current may include any available and useful modification process, for example, but not limited to amplitude-modification (AM) and frequency-modification (FM).

The modified or non-modified driving current is supplied to the modified signal light emitting element 124. The modified signal light emitting element 124 receives either the modified driving current or the non-modified driving current from the light-emitting element driver 100. Upon receipt of the modified driving current, the modified signal light emitting element 124 emits a modified signal light based on the modified driving current from the light-emitting element driver 100, wherein the modified signal light serves as an optical signal which corresponds to the external information signal 180 for realizing data transmission depending upon the modified signal light 164 emitted from the modified signal light emitting element 124. Upon receipt of the non-modified driving current, the modified signal light emitting element 124 emits a non-modified non-signal light based on the non-modified driving current from the light-emitting element driver 100, wherein the non-modified non-signal light merely serves as illumination or normal light.

As described above, the non-modified non-signal light emitting elements 122 emit the non-modified non-signal lights 162 independent from the external information signal 180, wherein the non-modified non-signal light emitting elements 122 are operatively and functionally separated from the light-emitting element driver 100.

Figure 5:
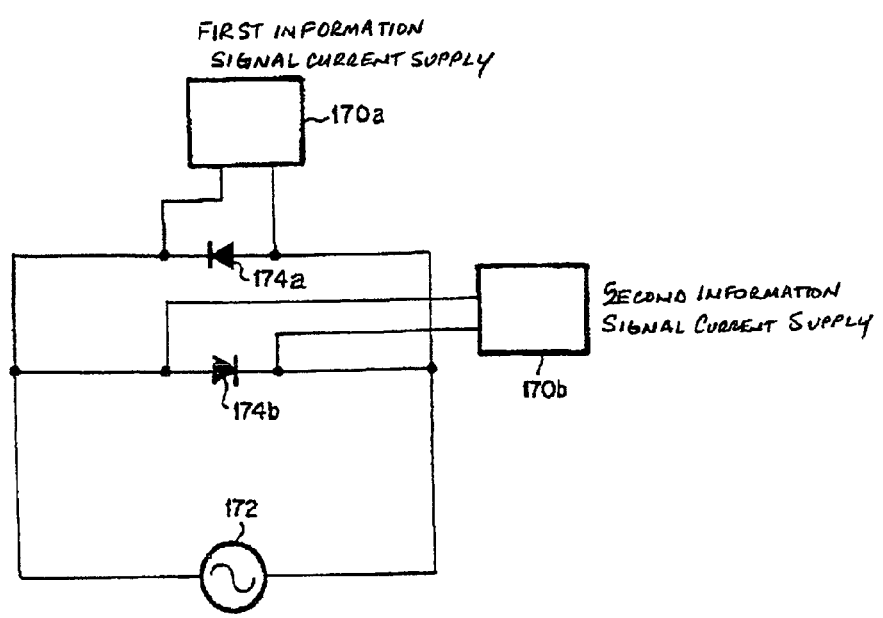
FIG. 5 is a block diagram illustrative of still another novel light-emitting device included in the novel communication system in still another preferred embodiment in accordance with the present invention.

In one typical example, an AC-power supply may optionally be used as a current source for emitting the non-modified non-signal lights 162. FIG. 5 is a block diagram illustrative of still another novel light-emitting device included in the novel communication system in still another preferred embodiment in accordance with the present invention.

The light-emitting device includes a first light emitting-element 174a, a second light emitting-element 174b, an AC-power supply 172, and a first information signal current supply 170a and a second information signal current supply 170b. The first and second light emitting-elements 174a and 174b are coupled to the AC-power supply 172 in parallel to each other, provided that the first light emitting-element 174a is opposite in both phase and polarity with reference to the AC-power supply 172 to the second light emitting-element 174b. The first light emitting-element 174a is electrically coupled to the first information signal current supply 170a, so that the first information signal current supply 170a modifies a current based on the information signal and supplies the modified current to the first light emitting-element 174a. The second light emitting-element 174b is electrically coupled to the second information signal current supply 170b, so that the second information signal current supply 170b modifies a current based on the information signal and supplies the modified current to the second light emitting-element 174b. Each of the first and second light emitting-elements 174a and 174b is capable of emitting the signal light and the non-signal light.

Figure 6A:
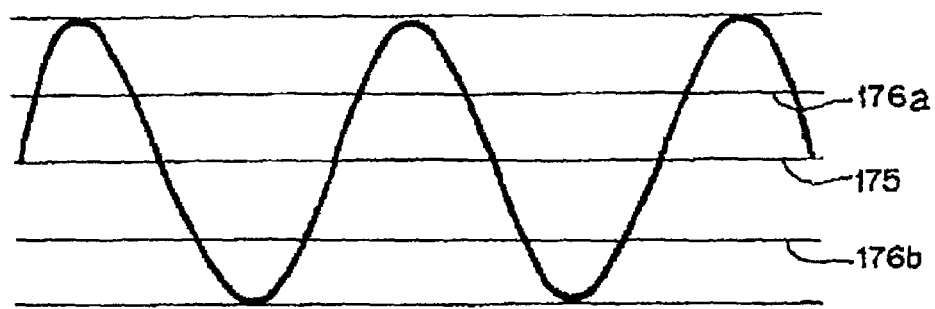
FIG. 6A is a diagram illustrative of a waveform of a power voltage supplied from the AC-power supply included in the light-emitting device of FIG. 5.

FIG. 6A is a diagram illustrative of a waveform of a power voltage supplied from the AC-power supply included in the light-emitting device of FIG. 5. "175" represents a zero-level of the voltage supplied from the AC-power supply 172. "176a" represents a first threshold voltage for enabling the first light emitting-element 174a to emit a light. "176b" represents a second threshold voltage for enabling the second light emitting-element 174b to emit a light.

In general, the electroluminescence device emits a light upon an application of a voltage in a positive polarity direction, provided that the applied voltage level is not less than the threshold voltage level. The electroluminescence device does not emit any light upon voltage application in a negative polarity direction. Namely, the first light emitting-element 174a emits a light upon receipt of the voltage application in the positive polarity direction, provided that the applied voltage level is not less than the first threshold voltage 176a. The second light emitting-element 174b emits a light upon receipt of the voltage application in the positive polarity direction, provided that the applied voltage level is not less than the second threshold voltage 176b.

Figure 6B:
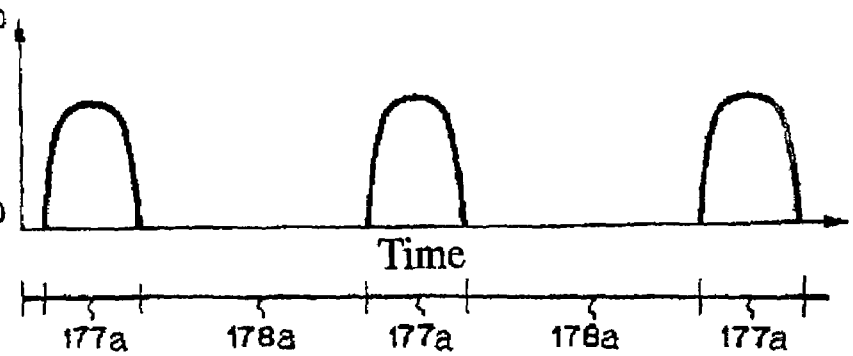
FIG. 6B is a diagram illustrative of light emission timings of the first light emitting-element upon receipt of a power supply with the voltage waveform of FIG. 6A from the AC-power supply in FIG. 5.
Figure 6C:
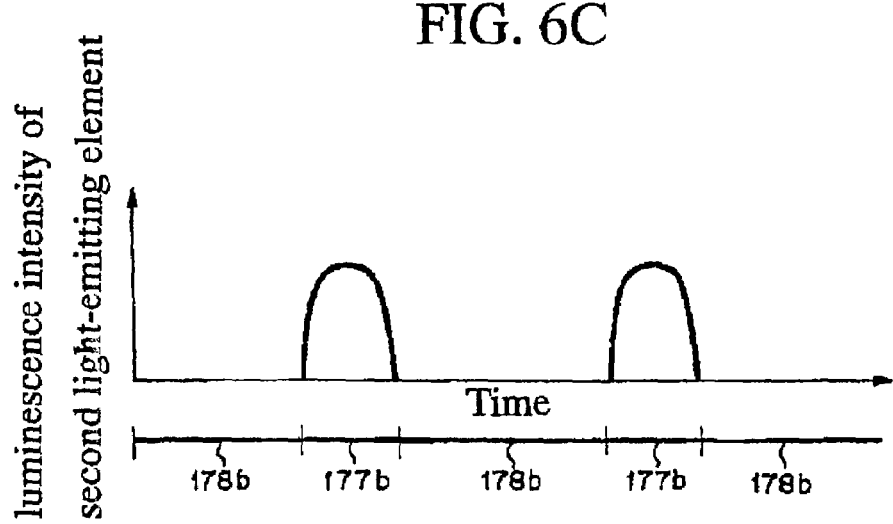
FIG. 6C is a diagram illustrative of light emission timings of the second light emitting-element upon receipt of a power supply with the voltage waveform of FIG. 6A from the AC-power supply in FIG. 5.
Figure 6D:
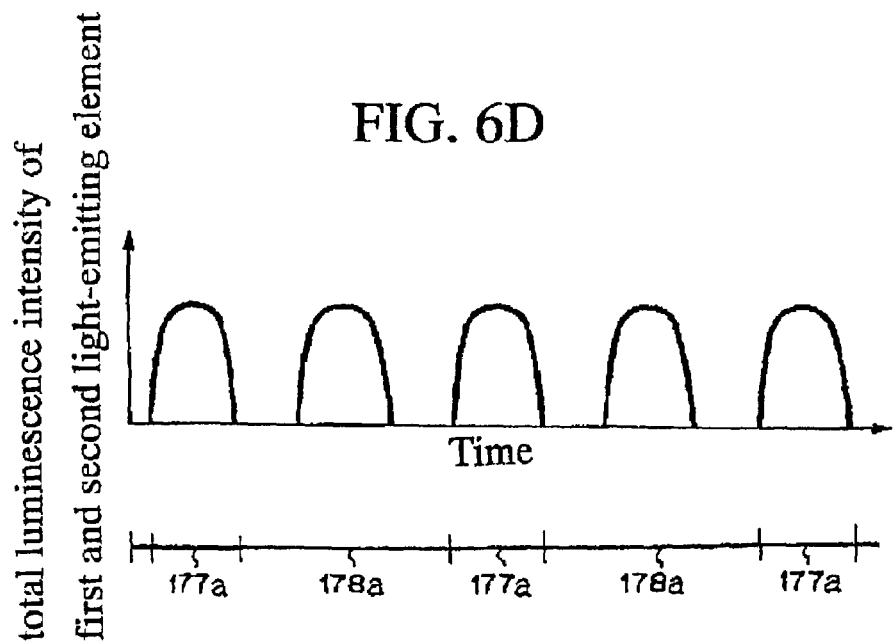
FIG. 6D is a diagram illustrative of comprehensive light emission timings of the first and second light emitting-elements upon receipt of a power supply with the voltage waveform of FIG. 6A from the AC-power supply in FIG. 5.

FIG. 6B is a diagram illustrative of light emission timings of the first light emitting-element upon receipt of a power supply with the voltage waveform of FIG. 6A from the AC-power supply in FIG. 5. FIG. 6C is a diagram illustrative of light emission timings of the second light emitting-element upon receipt of a power supply with the voltage waveform of FIG. 6A from the AC-power supply in FIG. 5. FIG. 6D is a diagram illustrative of comprehensive light emission timings of the first and second light emitting-elements upon receipt of a power supply with the voltage waveform of FIG. 6A from the AC-power supply in FIG. 5. "177a" represents a time period when the first light emitting-element 174a emits a non-signal illumination light. "177b" represents a time period when the second light emitting-element 174b emits a non-signal illumination light. "178b" represents a time period when the first and second light emitting-elements 174a and 174b do not emit any non-signal illumination light. The time period "178b" does mean the time period allowing the first or second information signal supply 170a or 170b supplies the modified current to the first or second light emitting-element 174a or 174b to enable the first or second light emitting-element 174a or 174b to emit the signal light in accordance with the received modified current.

In the above-described example, a pair of the single first light emitting-element 174a and the single second light emitting-element 174b is provided. The respective numbers of the first light emitting-element 174a and the second light emitting-element 174b should not be limited to one. Accordingly, at least one first light emitting-element 174a and at least one second light emitting-element 174b may thus be provided.

In another example, a plurality of first light emitting-element 174a and a plurality of second light emitting-element 174b may be provided. Some of those plural first and second light emitting-elements 174a and 174b may optionally be connected in series, and the number of the parallel connection of those plural first and second light emitting-elements 174a and 174b with reference to the AC-power supply 172 may be optional.

In still another example, a plurality of first light emitting-element 174a and a single second light emitting-element 174b may be provided. Some of those plural first light emitting-elements 174a may optionally be connected in series, and the number of the parallel connection of those plural first and second light emitting-elements 174a and 174b with reference to the AC-power supply 172 may be optional.

In yet another example, a single first light emitting-element 174a and a plurality of second light emitting-element 174b may be provided. Some of those plural second light emitting-elements 174b may optionally be connected in series, and the number of the parallel connection of those plural first and second light emitting-elements 174a and 174b with reference to the AC-power supply 172 may be optional. The above-described first novel light-emitting device shown in FIG. 1 may be applicable to a communication system.

An example of the communication system including the light-emitting device as described above will be described FIG. 7 is a block diagram illustrative of a novel communication system including a novel light-emitting device shown in FIG. 1. The communication system includes the light emitting device described above and shown in FIG. 1 and a light receiving device.

The light-emitting device may include a light-emitting element driver 100 and a light-emitting element 120. The light-emitting element driver 100 drives the light-emitting element 120 for enabling the light-emitting element 120 to emit a light 160. In order to realize a desired high speed data transmission, it is essential to obtain a shortened rise time of the luminance of the light 160 emitted from the light-emitting element 120, for which reason it is important what kind of light-emitting element is used or selected for the light-emitting element 120. In accordance with the present invention, the light-emitting element 120 may comprise at least one electroluminescence element for the purpose of obtaining shortened rise time of the luminance of the light 160 emitted from the light-emitting element 120. The light-emitting element 120 will sometime hereinafter be referred to as an electroluminescence element 120.

The light-emitting element driver 100 may receives selective entry an external information signal 180 and does output a driving current in accordance with the external information signal 180. The entry of the external information signal 180 into the light-emitting element driver 100 causes the light-emitting element driver 100 to perform a predetermined modification process for modifying the driving current in accordance with the external information signal 180 before the light-emitting element driver 100 outputs a modified driving current. No entry of the external information signal 180 into the light-emitting element driver 100 causes the light-emitting element driver 100 to perform a direct output of the non-modified driving current without any modification process. The modification of the driving current may include any available and useful modification process, for example, but not limited to amplitude-modification (AM) and frequency-modification (FM).

The modified or non-modified driving current is supplied to the light-emitting element 120. The light-emitting element 120 receives either the modified driving current or the non-modified driving current from the light-emitting element driver 100. Upon receipt of the modified driving current, the light-emitting element 120 emits a modified signal light based on the modified driving current from the light-emitting element driver 100, wherein the modified signal light serves as an optical signal which corresponds to the external information signal 180 for realizing data transmission depending upon the modified signal light 160 emitted from the light-emitting element 120. Upon receipt of the non-modified driving current, the light-emitting element 120 emits a non-modified non-signal light based on the non-modified driving current from the light-emitting element driver 100, wherein the non-modified non-signal light merely serves as illumination or normal light.

The light receiving device includes a light receiving element 130 and a signal converter 400. The light receiving element 130 receives a signal light 160 emitted from the light-emitting element 120 and converts the received signal light into a voltage signal or a current signal for outputting the voltage or current signal. The signal converter 400 is electrically coupled to the light receiving element 130 for receiving the voltage or current signal from the light receiving element 130 and converting the received voltage or current signal into data signals 410. The data signals 410 are then outputted from the signal converter 400.

Figure 7:
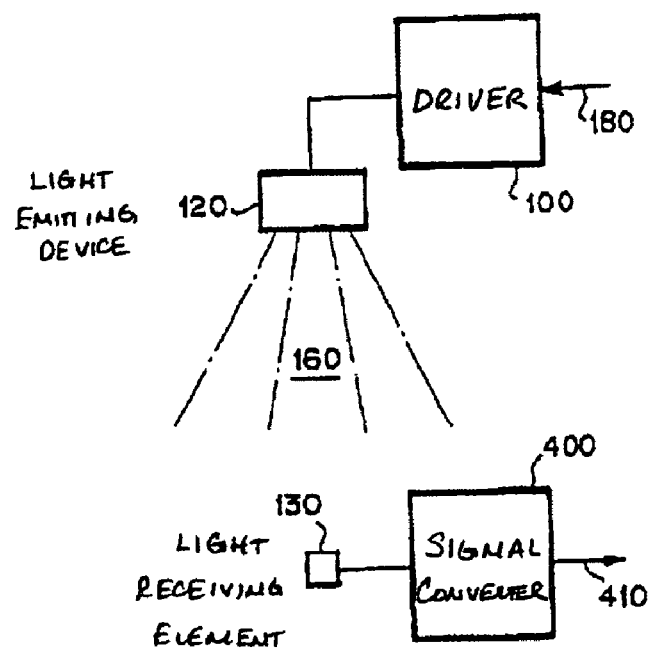
FIG. 7 is a block diagram illustrative of a novel communication system including a novel light-emitting device shown in FIG. 1.
Figure 8:
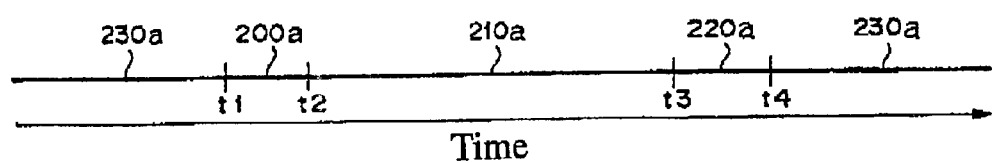
FIG. 8 is a view illustrative of an example of time-sequence of the modified signal light and non-modified non-signal illumination light emitted from the light-emitting element shown in FIG. 7.

FIG. 8 is a view illustrative of an example of time-sequence of the modified signal light and non-modified non-signal illumination light emitted from the light-emitting element shown in FIG. 7. "230a" represents a non-modified non-signal illumination light emitting period, wherein the non-modified non-signal illumination light is emitted from the light-emitting element 120 upon receipt of the non-modified driving current from the light-emitting element driver 100. "200a" represents a transmission start signal light emitting period defined between a time "t1" to a time "t2", wherein a transmission start signal light is emitted from the light-emitting element 120. The transmission start signal light is a signal which indicates that signal light will be transmitted subsequently to this transmission start signal light. "210a" represents a modified signal light emitting period defined between the time "t2" to a time "t3", wherein the modified signal light is emitted from the light-emitting element 120 based on the modified driving current from the light-emitting element driver 100. "220a" represents a transmission end signal light emitting period defined between the time "t3" to a time "t4", wherein a transmission end signal light is emitted from the light-emitting element 120. The transmission end signal light is a signal which indicates that the signal light transmission has just been completed and finished. Following to the transmission end signal light emitting period "220a", the non-modified non-signal illumination light emitting period "230a" appears again, wherein the non-modified non-signal illumination light is emitted from the light-emitting element 120 upon receipt of the non-modified driving current from the light-emitting element driver 100.

Figure 9:
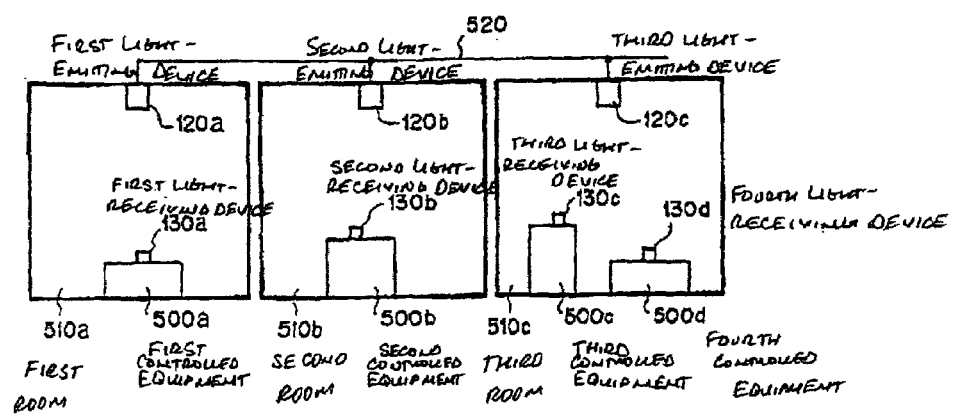
FIG. 9 is a block diagram illustrative of a novel communication system including a novel light-emitting device shown in FIG. 1.

Another example of the communication system including the light-emitting device as described above will be described. FIG. 9 is a block diagram illustrative of a novel communication system including a novel light-emitting device shown in FIG. 1. The communication system includes a plurality of rooms 510, each of which further accommodates at least one light-emitting device 120 and at least one light-receiving device 130 which is coupled to at least one equipment 500. In one typical example, the communication system includes first, second and third rooms 510a, 510b and 510c. It is important for the present invention that the at least one light-emitting device 120 comprises at least one electroluminescence device for the purpose of obtaining shortened rise time of the luminance of the light emitted from the at least one light-emitting element 120.

The first room 510a accommodates a first light emitting element 120a and a first light-receiving device 130a for receiving a signal light emitted from the first light emitting element 120a, wherein the first light-receiving device 130a is coupled to a first equipment 500a accommodated in the first room 510a for controlling the first equipment 500a. The first light emitting element 120a is also coupled to a first light-emitting element driver which is not illustrated. The first light-emitting element driver may be interposed between the first light emitting element 120a and an interconnection 520 which transmits an external information signal to the first light-emitting element driver.

Upon entry of the external information signal into the first light-emitting element driver, the first light-emitting element driver generates a first modified current according to the external information signal and supplies the first modified current to the first light emitting element 120a, so that the first light emitting element 120a emits a first signal light based on the first modified current. The first light-receiving device 130a receives the first signal light from the first light emitting element 120a. The first light-receiving device 130a converts the first signal light into a first electric signal and supplies the first electric signal to the first equipment 500a, so that the first equipment 500a is controlled by the first electric signal.

No entry of the external information signal into the first light-emitting element driver makes the first light-emitting element driver generate a first non-modified current and supplies the first non-modified current to the first light emitting element 120a, so that the first light emitting element 120a emits a first non-signal illumination light for illuminating the first room 510a.

The second room 510b accommodates a second light emitting element 120b and a second light-receiving device 130b for receiving a signal light emitted from the second light emitting element 120b, wherein the second light-receiving device 130b is coupled to a second equipment 500b accommodated in the second room 510b for controlling the second equipment 500b. The second light emitting element 120b is also coupled to a second light-emitting element driver which is not illustrated. The second light-emitting element driver may be interposed between the second light emitting element 120b and the interconnection 520 which transmits an external information signal to the second light-emitting element driver.

Upon entry of the external information signal into the second light-emitting element driver, the second light-emitting element driver generates a second modified current according to the external information signal and supplies the second modified current to the second light emitting element 120b, so that the second light emitting element 120b emits a second signal light based on the second modified current. The second light-receiving device 130b receives the second signal light from the second light emitting element 120b. The second light-receiving device 130b converts the second signal light into a second electric signal and supplies the second electric signal to the second equipment 500b, so that the second equipment 500b is controlled by the second electric signal.

No entry of the external information signal into the second light-emitting element driver makes the second light-emitting element driver generate a second non-modified current and supplies the second non-modified current to the second light emitting element 120b, so that the second light emitting element 120b emits a second non-signal illumination light for illuminating the second room 510b.

The third room 510c accommodates a third light emitting element 120c and third and fourth light-receiving devices 130c and 130d for receiving a signal light emitted from the third light emitting element 120c, wherein the third light-receiving device 130c is coupled to a third equipment 500c accommodated in the third room 510c for controlling the third equipment 500c, while the fourth light-receiving device 130d is coupled to a fourth equipment 500d accommodated in the third room 510c for controlling the fourth equipment 500d. The third light emitting element 120c is also coupled to a third light-emitting element driver which is not illustrated. The third light-emitting element driver may be interposed between the third light emitting element 120c and the interconnection 520 which transmits an external information signal to the third light-emitting element driver.

Upon entry of the external information signal into the third light-emitting element driver, the third light-emitting element driver generates a third modified current according to the external information signal and supplies the third modified current to the third light emitting element 120c, so that the third light emitting element 120c emits a third signal light based on the third modified current. The third light-receiving device 130c receives the third signal light from the third light emitting element 120c. The third light-receiving device 130c converts the third signal light into a third electric signal and supplies the third electric signal to the third equipment 500c, so that the third equipment 500c is controlled by the third electric signal. The fourth light-receiving device 130d receives the signal light from the third light emitting element 120c. The fourth light-receiving device 130d converts the third signal light into a fourth electric signal and supplies the fourth electric signal to the fourth equipment 500d, so that the fourth equipment 500d is controlled by the fourth electric signal.

No entry of the external information signal into the third light-emitting element driver makes the third light-emitting element driver generate a third non-modified current and supplies the third non-modified current to the third light emitting element 120c, so that the third light emitting element 120c emits a third non-signal illumination light for illuminating the third room 510c.

In one typical example, the respective emissions of the first, second and third light-emitting devices may be controlled separately and independently from each other for realizing independent controls to the first, second and third equipments 500a, 500b and 500c.

Alternatively, the respective emissions of the first, second and third light-emitting devices may be controlled commonly. In this example, it may be possible that an identification signal light is emitted, followed by the above-described signal light emission. The identification signal light identifies or designates one of the first, second, third and fourth equipments 500a, 500b, 500c and 500d, so that the subsequent common signal light is effective to only the designated one of the first, second, third and fourth equipments 500a, 500b, 500c and 500d. Namely, the identification common signal lights are emitted from the first, second and third light-emitting elements 120a, 120b and 120c and then received by the first, second, third and fourth light-receiving elements 130a, 130b, 130c and 130d, whereby the identification common signal lights are converted into an electric identification signal which designates selected one of the first, second, third and fourth equipments 500a, 500b, 500c and 500d. Subsequently, the common signal lights are emitted from the first, second and third light-emitting elements 120a, 120b and 120c and then received by the first, second, third and fourth light-receiving elements 130a, 130b, 130c and 130d, whereby the common signal lights are converted into a common electric signal. The common electric signal is then supplied to the first, second, third and fourth equipments 500a, 500b, 500c and 500d. However, the common electric signal is effective to only the designated one of the first, second, third and fourth equipments 500a, 500b, 500c and 500d, whereby only the designated one of the first, second, third and fourth equipments 500a, 500b, 500c and 500d is controlled by the common electric signal. In this example, the number of designated equipments is only one. However, the identification signal may optionally designate one or more equipments, to which the electric signal converted from the signal light emitted from the first, second and third light-emitting elements 120a, 120b and 120c is effected for control thereof.

Figure 10:
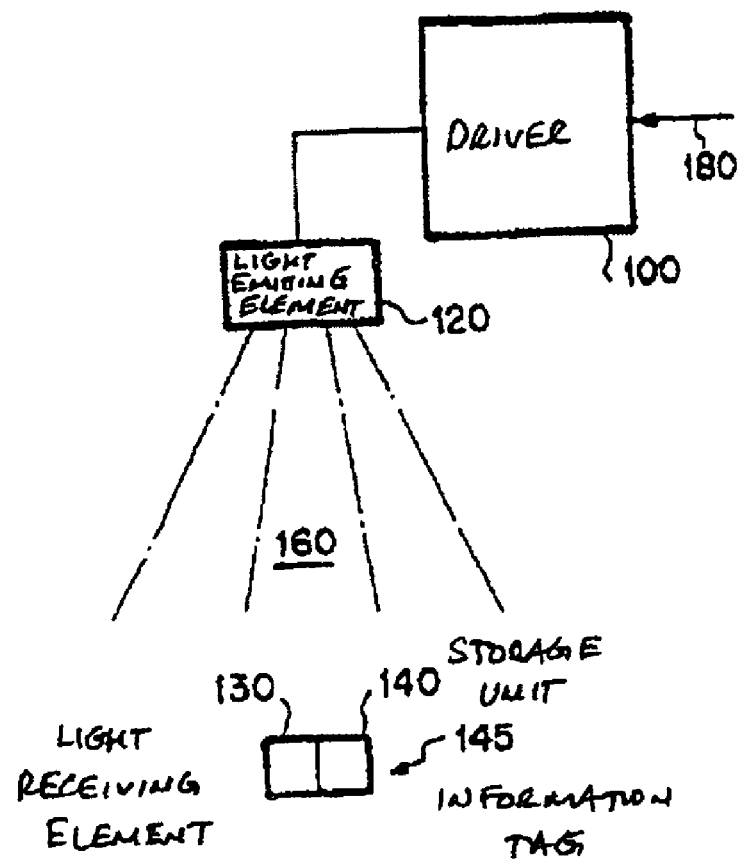
FIG. 10 is a block diagram illustrative of a novel communication system including a novel light-emitting device shown in FIG. 1.

Still another example of the communication system including the light-emitting device as described above will be described. FIG. 10 is a block diagram illustrative of a novel communication system including a novel light-emitting device shown in FIG. 1. The communication system includes the light emitting device described above and shown in FIG. 1 and a light receiving device.

The light-emitting device may include a light-emitting element driver 100 and a light-emitting element 120. The light-emitting element driver 100 drives the light-emitting element 120 for enabling the light-emitting element 120 to emit a light 160. In order to realize a desired high speed data transmission, it is essential to obtain a shortened rise time of the luminance of the light 160 emitted from the light-emitting element 120, for which reason it is important what kind of light-emitting element is used or selected for the light-emitting element 120. In accordance with the present invention, the light-emitting element 120 may comprise at least one electroluminescence element for the purpose of obtaining shortened rise time of the luminance of the light 160 emitted from the light-emitting element 120. The light-emitting element 120 will sometime hereinafter be referred to as an electroluminescence element 120. The single electroluminescence element may be used for emitting a light having a desired spectrum. A plurality of electroluminescence element may also be used for emitting another light having another desired spectrum.

The light-emitting element driver 100 may receives selective entry an external information signal 180 and does output a driving current in accordance with the external information signal 180. The entry of the external information signal 180 into the light-emitting element driver 100 causes the light-emitting element driver 100 to perform a predetermined modification process for modifying the driving current in accordance with the external information signal 180 before the light-emitting element driver 100 outputs a modified driving current. No entry of the external information signal 180 into the light-emitting element driver 100 causes the light-emitting element driver 100 to perform a direct output of the non-modified driving current without any modification process. The modification of the driving current may include any available and useful modification process, for example, but not limited to amplitude-modification (AM) and frequency-modification (FM).

The modified or non-modified driving current is supplied to the light-emitting element 120. The light-emitting element 120 receives either the modified driving current or the non-modified driving current from the light-emitting element driver 100. Upon receipt of the modified driving current, the light-emitting element 120 emits a modified signal light based on the modified driving current from the light-emitting element driver 100, wherein the modified signal light serves as an optical signal which corresponds to the external information signal 180 for realizing data transmission depending upon the modified signal light 160 emitted from the light-emitting element 120. Upon receipt of the non-modified driving current, the light-emitting element 120 emits a non-modified non-signal light based on the non-modified driving current from the light-emitting element driver 100, wherein the non-modified non-signal light merely serves as illumination or normal light.

The light receiving device includes a light receiving element 130 and a signal converter not illustrated as well as a storage unit 140. The light receiving element 130 receives a signal light 160 emitted from the light-emitting element 120 and converts the received signal light into a voltage signal or a current signal for outputting the voltage or current signal. The signal converter not illustrated is electrically coupled to the light receiving element 130 for receiving the voltage or current signal from the light receiving element 130 and converting the received voltage or current signal into data signals. The data signals are then transmitted to the storage unit 140, so that the storage unit 140 stores the data signals. A combination of the light receiving element 130 and the storage unit 140 may comprise an information tag 145.

The storage unit 140 may be any available storage unit or medium. The storage unit 140 may include, but not limited to, any available semiconductor memory devices such as flash memory and FERAM, any available magnetic memory devices such as MRAM, magnetic disk and magnetic card, and any available optical memory devices such as optical disk and optical card.

Figure 11:
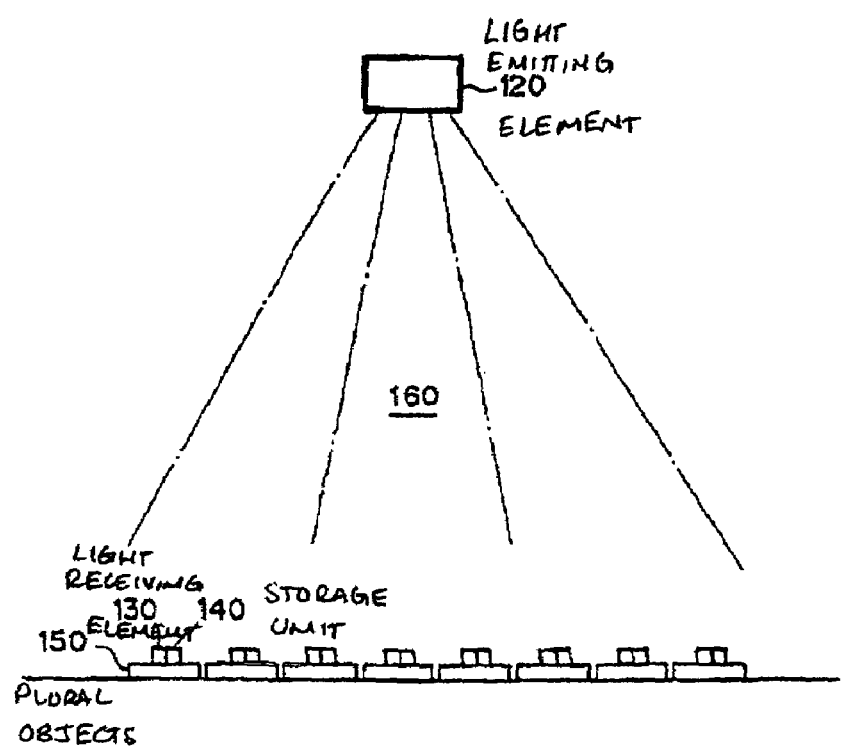
FIG. 11 is a block diagram illustrative of a novel communication system including a novel light-emitting device shown in FIG. 1.

Yet another example of the communication system including the light-emitting device as described above will be described. FIG. 11 is a block diagram illustrative of a novel communication system including a novel light-emitting device shown in FIG. 1. The communication system includes the light emitting device described above and shown in FIG. 1 and a plurality of light receiving device over a plurality of objects 150 aligned.

The light-emitting device may include a light-emitting element driver not illustrated and a light-emitting element 120. The light-emitting element driver not illustrated drives the light-emitting element 120 for enabling the light-emitting element 120 to emit a light 160. In order to realize a desired high speed data transmission, it is essential to obtain a shortened rise time of the luminance of the light 160 emitted from the light-emitting element 120, for which reason it is important what kind of light-emitting element is used or selected for the light-emitting element 120. In accordance with the present invention, the light-emitting element 120 may comprise at least one electroluminescence element for the purpose of obtaining shortened rise time of the luminance of the light 160 emitted from the light-emitting element 120. The light-emitting element 120 will sometime hereinafter be referred to as an electroluminescence element 120. The single electroluminescence element may be used for emitting a light having a desired spectrum. A plurality of electroluminescence element may also be used for emitting another light having another desired spectrum.

The light-emitting element driver not illustrated may receives selective entry an external information signal and does output a driving current in accordance with the external information signal. The entry of the external information signal into the light-emitting element driver causes the light-emitting element driver to perform a predetermined modification process for modifying the driving current in accordance with the external information signal before the light-emitting element driver outputs a modified driving current. No entry of the external information signal into the light-emitting element driver causes the light-emitting element driver to perform a direct output of the non-modified driving current without any modification process. The modification of the driving current may include any available and useful modification process, for example, but not limited to amplitude-modification (AM) and frequency-modification (M).

The modified or non-modified driving current is supplied to the light-emitting element 120. The light-emitting element 120 receives either the modified driving current or the non-modified driving current from the light-emitting element driver. Upon receipt of the modified driving current, the light-emitting element 120 emits a modified signal light based on the modified driving current from the light-emitting element driver, wherein the modified signal light serves as an optical signal which corresponds to the external information signal for realizing data transmission depending upon the modified signal light 160 emitted from the light-emitting element 120. Upon receipt of the non-modified driving current, the light-emitting element 120 emits a non-modified non-signal light based on the non-modified driving current from the light-emitting element driver, wherein the non-modified non-signal light merely serves as illumination or normal light.

The light receiving device includes plural sets of a light receiving element 130, a signal converter not illustrated and a storage unit 140, wherein each set is provided over each of the plural objects 150 which are aligned. The each light receiving element 130 receives a signal light 160 emitted from the light-emitting element 120 and converts the received signal light into a voltage signal or a current signal for outputting the voltage or current signal. The each signal converter is electrically coupled to the each light receiving element 130 for receiving the voltage or current signal from the each light receiving element 130 and converting the received voltage or current signal into data signals. The data signals are then transmitted to the each storage unit 140, so that the each storage unit 140 stores the data signals. This communication system is capable of realizing a batch writing or re-writing operation for writing or re-writing informations belonging to the plural objects 150 by irradiation of the modified signal light from the light-emitting element 120.

The storage unit 140 may also be any available storage unit or medium. The storage unit 140 may include, but not limited to, any available semiconductor memory devices such as flash memory and FERAM, any available magnetic memory devices such as MRAM, magnetic disk and magnetic card, and any available optical memory devices such as optical disk and optical card.

This communication system may, for example, be applicable to an improved point-of-sale-system (POS-system). Each combination of the each light receiving element 130 and the each storage unit 140 may comprise an each information tag assigned to the each object 150 instead of bar-code for the POS-system. The information on the bar-code can not be re-written. The informations stored in the each storage unit 140 may be re-written conveniently and within a short time as well as at a low cost. This system is capable of renewing and/or reproducing the informations attached to the objects 150 or re-writing the information stored in the storage unit attached to the object conveniently, however, without need for any additional procedures as well as without placing the third party in an allowable condition for knowing or being aware of the fact of the renewal and/or the old information as renewed, and also without providing any substantive damage to the identification-required object as well as without deterioration of appearance of the identification-required object.

Figure 12:
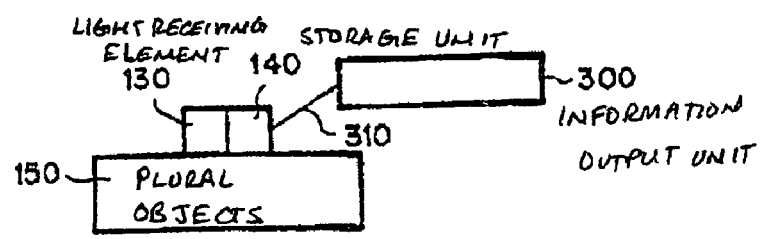
FIG. 12 is a schematic view of each light-receiving device provided on the each object, wherein the each light-receiving device is coupled to an information output unit in a modified example from the example shown in FIG. 11.

The above described each light-receiving device provided on the each object 150 may optionally be any available information output unit for outputting the information stored in the each storage unit 140 for realizing an example of human interface. FIG. 12 is a schematic view of each light-receiving device provided on the each object, wherein the each light-receiving device is coupled to an information output unit in a modified example from the example shown in FIG. 11. Each pair of the light-emitting element 130 and the storage unit 140 is provided on the each object 150. The storage unit 140 may operatively and functionally coupled to an information output unit 300 for outputting the information stored in the storage unit 140. The information output unit 300 may be realized by any available information output unit which may, for example, include, but not limited to, a display for displaying the stored information to enable human to view the informations. In one typical example, the storage unit 140 is electrically connected through an interconnection 310 to the display 300. In one example, one-dimensional or two-dimensional code-patterns similar to the bar-code patterns may be displayed on the display, so that this system is compatible to the existent POS-system.

Accordingly, the above-described novel communication system including the light-emitting device comprising at least one electroluminescence element can realize a high speed data transmission.

The communication system is capable of renewing and/or reproducing the informations attached to the identification-required object or re-writing the information stored in the storage unit attached to the identification-required object conveniently, however, without need for any additional procedures. The communication system is also capable of renewing and/or reproducing the informations attached to the identification-required object or re-writing the information stored in the storage unit attached to the identification-required object without placing the third party in an allowable condition for knowing or being aware of the fact of the renewal and/or the old information as renewed. The communication system is also capable of renewing and/or reproducing the informations attached to the identification-required object or re-writing the information stored in the storage unit attached to the identification-required object without providing any substantive damage to the identification-required object. The communication system is also capable of renewing and/or reproducing the informations attached to the identification-required object or re-writing the information stored in the storage unit attached to the identification-required object without deterioration of appearance of the identification-required object Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A light-emitting device, comprising:
   at least one driver unit for generating a modified current based on an externally entered information signal; and
   at least one light-emitting unit operatively and functionally coupled to said at least one driver unit for receiving said modified current and emitting a modified signal light, said modified signal light comprising a modification of a non-signal illumination light, said modification comprising an optical signal that corresponds to said externally entered information signal,
   wherein said modified signal light and said non-signal illumination light are emitted at different time periods, said modified signal light not causing perceptible flickering illumination light,
   wherein said at least one light-emitting unit comprises at least one electroluminescence element and first and second light-emitting unit groups, the first light emitting unit group being capable of emitting said non-signal illumination light and the second light emitting unit group being capable of emitting said modified signal light,
   wherein said at least one driver unit comprises a first driver unit electrically coupled to said first light-emitting unit group for supplying said first light-emitting unit group with a first modified current upon entry of said externally entered information signal or a first non-modified current upon non-entry of any information signal and a second driver unit electrically coupled to said second light-emitting unit group for supplying said second light-emitting unit group with a second modified current upon entry of said externally entered information signal or a second non-modified current upon non-entry of any information signal,
   wherein said first and second light-emitting unit groups are electrically coupled in opposite polarities to each other to an AC-power supply, and
   each of said first and second light-emitting unit groups emits said modified signal light and said non-signal illumination light alternately.

2. The light-emitting device as claimed in claim 1, wherein said at least one light-emitting unit receives a non-modified current and emits said non-signal illumination light free of any information when said at least one driver unit generates the non-modified current upon no entry of any externally entered information signal.

3. The light-emitting device as claimed in claim 1, further comprising:
   at least one secondary light-emitting unit operatively and functionally separated from said at least one driver unit and also from said at least one light-emitting unit for emitting a non-signal illumination light free of any information.

4. The light-emitting device as claimed in claim 3, wherein said at least one light-emitting unit receives a non-modified current and emits a non-signal illumination light free of any information when said at least one driver unit generates the non-modified current upon no entry of any externally entered information signal.

5. The light-emitting device as claimed in claim 1, wherein at least one group of said first and second light-emitting unit groups comprises a plurality of light-emitting elements, some of which are connected in series to each other.

6. A communication system, comprising:
   at least one light-emitting device for emitting a light; and
   at least one light-receiving device for receiving said light coming from said at least one light-emitting device,
   said at least one light-emitting device further comprising:
   at least one driver unit for generating a modified current based on an externally entered information signal; and
   at least one light-emitting unit operatively and functionally coupled to said at least one driver unit for receiving said modified current and emitting a modified signal light, said modified signal light comprising a modification of a non-signal illumination light, said modification comprising an optical signal that corresponds to said externally entered information signal,
   wherein said modified signal light and said non-signal illumination light are emitted at different time periods, said modified signal light not causing perceptible flickering illumination light, and
   wherein said at least one light-emitting unit comprises at least one electroluminescence element and first and second light-emitting unit groups, the first light-emitting unit group being capable of emitting said non-signal illumination light and the second light-emitting unit group being capable of emitting said modified signal light,
   wherein said at least one driver unit comprises a first driver unit electrically coupled to said first light-emitting unit group for supplying said first light-emitting unit group with a first modified current upon entry of said externally entered information signal or a first non-modified current upon non-entry of any information signal and a second driver unit electrically coupled to said second light-emitting unit group for supplying said second light-emitting unit group with a second modified current upon entry of said externally entered information signal or a second non-modified current upon non-entry of any information signal,
   wherein said first and second light-emitting unit groups are electrically coupled in opposite polarities to each other to an AC-power supply, and
   each of said first and second light-emitting unit groups emits said modified signal light and said non-signal illumination light alternately.

7. The communication system as claimed in claim 6, wherein said at least one light-emitting unit receives a non-modified current and emits said non-signal illumination light free of any information when said at least one driver unit generates the non-modified current upon no entry of any externally entered information signal.

8. The communication system as claimed in claim 6, further comprising:
   at least one secondary light-emitting unit operatively and functionally separated from said at least one driver unit and also from said at least one light-emitting unit for emitting a non-signal illumination light free of any information.

9. The communication system as claimed in claim 8, wherein said at least one light-emitting unit receives a non-modified current and emits said non-signal illumination light free of any information when said at least one driver unit generates the non-modified current upon no entry of any externally entered information signal.

10. The communication system as claimed in claim 6, wherein at least one group of said first and second light-emitting unit groups comprises a plurality of light-emitting elements, some of which are connected in series to each other.

11. The communication system as claimed in claim 6, wherein said at least one light-receiving device further comprises:
- at least one light-receiving element for receiving said modified signal light emitted from said at least one light-emitting device and converting said modified signal light into an electric signal.

12. The communication system as claimed in claim 6, wherein said at least one light-receiving device further comprises:
- at least one light-receiving element for receiving said modified signal light emitted from said at least one light-emitting device and converting said modified signal light into an electric signal; and
- at least one signal converter unit electrically coupled to said at least one light-receiving element for converting said electric signal into data.

13. The communication system as claimed in claim 6, wherein said at least one light-receiving device further comprises:
- at least one light-receiving element for receiving said modified signal light emitted from said at least one light-emitting device and converting said modified signal light into an electric signal;
- at least one signal converter unit electrically coupled to said at least one light-receiving element for converting said electric signal into data; and
- at least one storage unit electrically coupled to said at least one signal converter unit for storing said data.

14. The communication system as claimed in claim 13, wherein said at least one light-receiving device is provided on an object for serving as an information tag.

15. The communication system as claimed in claim 6, wherein said at least one light-receiving device further comprises:
- at least one light-receiving element for receiving said modified signal light emitted from said at least one light-emitting device and converting said modified signal light into an electric signal;
- at least one signal converter unit electrically coupled to said at least one light-receiving element for converting said electric signal into data;
- at least one storage unit electrically coupled to said at least one signal converter unit for storing said data; and
- at least one information output unit electrically coupled to said at least one storage unit for receiving said data and displaying information based on said data.

16. The communication system as claimed in claim 6, wherein said at least one light-receiving device receives said modified signal light emitted from said at least one light-emitting device and converts said modified signal light into an electric signal, and said at least one light-receiving device is electrically coupled to an equipment for supplying said electric signal and controlling said equipment based on said electric signal.

* * * * *